United States Patent
Gilson

(10) Patent No.: US 10,565,139 B2
(45) Date of Patent: *Feb. 18, 2020

(54) INTELLIGENT PARTITIONING OF EXTERNAL MEMORY DEVICES

(71) Applicant: Comcast Cable Communications, LLC, Philadelphia, PA (US)

(72) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 46 days.

This patent is subject to a terminal disclaimer.

(21) Appl. No.: 14/494,033

(22) Filed: Sep. 23, 2014

(65) Prior Publication Data

US 2015/0081990 A1 Mar. 19, 2015

Related U.S. Application Data

(63) Continuation of application No. 13/097,914, filed on Apr. 29, 2011, now Pat. No. 8,880,795.

(51) Int. Cl.
*G06F 13/18* (2006.01)
*G06F 12/00* (2006.01)

(52) U.S. Cl.
CPC .............. *G06F 13/18* (2013.01); *G06F 12/00* (2013.01)

(58) Field of Classification Search
CPC .... G06F 3/067; G06F 11/1458; G06F 3/0644; G06F 9/5016; G06F 11/1048;
(Continued)

(56) References Cited

U.S. PATENT DOCUMENTS 6,857,046 B1 * 2/2005 Batcher ............... G06F 12/0842
711/129
7,567,991 B2 7/2009 Armangau et al.
(Continued)

OTHER PUBLICATIONS

Index tuning for adaptive multi-route data stream systems; Works et al.; International Symposium on Parallel & Distributed Processing, Workshops and Phd Forum; Apr. 19-23, 2010 (Year: 2010).*
(Continued)

*Primary Examiner* — Daniel C. Chappell
(74) *Attorney, Agent, or Firm* — Banner & Witcoff, Ltd.

(57) ABSTRACT

Multiple memory devices, such as hard drives, can be combined and logical partitions can be formed between the drives to allow a user to control regions on the drives that will be used for storing content, and also to provide redundancy of stored content in the event that one of the drives fails. Priority levels can be assigned to content recordings such that higher value content can be stored in more locations and easily accessible locations within the utilized drives. Users can control and organize how recorded content is stored between the drives such that an external drive may be removed from a first gateway device and attached to a second gateway device without losing the ability to access the recorded content from the first gateway device at a later time. In this manner, a user is provided with the ability to transport an external drive containing stored content recordings between multiple different gateway devices such that the recordings may be accessed at different locations or user premises.

20 Claims, 10 Drawing Sheets

(58) Field of Classification Search
CPC ............. G06F 12/0811; G06F 12/0866; G06F 2212/283; G06F 12/123; G06F 2212/45; G06F 9/544; G06F 11/2076; G06F 11/108; G06F 12/0804; G06F 13/28; G06F 13/4022; G06F 21/78; G06F 2211/103; G06F 2212/286; G06F 3/048; G06F 3/0688; G06F 3/16; G06F 9/52; G06F 11/2097; G06F 11/2035; G06F 17/30575; G06F 2201/80; G06F 3/065; G06F 9/50; G06F 3/0685; G06F 11/2094; G06F 11/2046; G06F 3/0689; G06F 12/00; G06F 3/0631; G06F 11/1448; G06F 3/064; G06F 16/137; G06F 16/27; G06F 11/1415; G06F 11/1451; G06F 2212/7202
See application file for complete search history.

(56) References Cited

U.S. PATENT DOCUMENTS

| | | | | |
|---|---|---|---|---|
| 8,146,091 B2* | 3/2012 | Johnson | ............... | G06F 9/5077 718/104 |
| 8,423,731 B1* | 4/2013 | Nadathur | ............ | G06F 11/1461 707/640 |
| 9,098,466 B2* | 8/2015 | Barnes | ................... | G06F 11/20 |
| 9,158,466 B1* | 10/2015 | Sahin | ................... | G06F 3/0625 |
| 2003/0191917 A1* | 10/2003 | McBrearty | ......... | G06F 11/1466 711/162 |
| 2004/0111558 A1* | 6/2004 | Kistler | .................. | G06F 1/3203 711/114 |
| 2008/0104248 A1* | 5/2008 | Yahiro | ................ | G06F 11/3495 709/226 |
| 2009/0113435 A1* | 4/2009 | Mizrachi | ............. | G06F 11/1461 718/102 |
| 2009/0228535 A1* | 9/2009 | Rathi | ...................... | G06F 3/048 |
| 2010/0169595 A1 | 7/2010 | Bryant-Rich | | |
| 2011/0153975 A1* | 6/2011 | Accapadi | ................ | G06F 12/08 711/170 |
| 2011/0191522 A1 | 8/2011 | Condict et al. | | |
| 2011/0213945 A1 | 9/2011 | Post et al. | | |
| 2011/0320865 A1* | 12/2011 | Jain | .................... | G06F 11/1088 714/6.22 |
| 2012/0047340 A1* | 2/2012 | Inaba | ................... | G06F 11/2069 711/162 |
| 2012/0079054 A1* | 3/2012 | Moroney | ........... | H04N 21/4126 709/213 |

OTHER PUBLICATIONS

RanKloud: scalable multimedia and social media retrieval and analysis in the cloud; Candan, K.; Proceedings of the 9th workshop on Large-scale and distributed informational retrieval, pp. 1-2; Oct. 28, 2011 (Year: 2011).*

On configuring a single disk continuous media server; Ghandeharizadeh et al.; Proceedings of the 1995 ACM SIGMETRICS joint international conference on Measurement and modeling of computer systems, pp. 37-46; May 15-19, 1995 (Year: 1995).*

* cited by examiner

| Priority Level | Stored Content Description |
|---|---|
| 6 | Live Buffer |
| 5 | Duplicate (content stored in another location) |
| 4 | About to be Deleted |
| 3 | Accessed and Not Accessed Older |
| 2 | Not Accessed Newer |
| 1 | Do Not Delete |

FIG. 3

INTELLIGENT PARTITIONING OF EXTERNAL MEMORY DEVICES

CROSS-REFERENCE TO RELATED APPLICATIONS

This application is a continuation of U.S. patent application Ser. No. 13/097,914, filed Apr. 29, 2011. This prior application is incorporated herein by reference.

BACKGROUND

When a user attaches, inserts, plugs-in, or otherwise adds one or more external hard drives or other similar storage devices to a media gateway device (e.g., a set-top box) in the user's home in order to record media content that is currently being delivered or will be delivered to the gateway device, the content will typically be recorded on the drive with the largest percentage of available memory or free space. Such is the case regardless of the type, character or quality of the content, as well as any general category that the content may be placed in. For example, if a user adds multiple external hard drives to a set-top box for the purpose of having additional storage space for media content recordings, or to provide one or more backups of the content recordings stored on the internal hard drive of the set-top box, the content will be stored to whichever drive has the most free space at the time the content becomes available for recording, even if the user prefers that certain media content (e.g., new television programs, video-on-demand movies, etc.) be recorded to one drive while all other content be recorded to another drive. As such, very few user-selectable options exist with respect to controlling where and how recorded content is stored when one or more external hard drives are used in conjunction with media gateway devices located at users' homes.

Additionally, users often face instances where, for one reason or another, the internal hard drive of their receiving device becomes damaged, destroyed or otherwise incurs some type of failure. While the internal hard drive may be repaired or replaced, the content recordings that the user stored on the drive are usually lost or erased as a result of the failure. Accordingly, having the ability as needed to backup the contents stored on an internal hard drive of such receiving devices allows users to prevent against such unexpected loss of saved content.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

When users add external hard drives or similar storage devices to the various types of media gateway and recording devices that they have in their homes, such as set-top boxes (STB), digital video recorders (DVR) and the like, much more can be done with the drives than simply using them as entirely separate partitions and storage locations for media content delivered to and/or viewed on such devices. For example, one or more external drives added to a media gateway device may be combined, along with the internal drive of the device, such that buffer regions of the drives are utilized more intelligently and at improved speeds. This ability to logically combine multiple drives exists even if the drives are not identical in size (e.g., differ in their storage capacity).

Aspects described herein generally relate to combining multiple hard drives and/or similar types of storage devices connected, attached, or otherwise added to a gateway device (e.g., set-top box (STB), digital video recorder (DVR), computer server, etc.), and forming logical partitions among the drives to allow a user (e.g., client, customer, viewer, subscriber, individual, user, etc.) to control and/or designate the regions on the drives that will be used for storing (e.g., recording, saving, duplicating, storing, etc.) recorded content based on priority assignments. In one example, the gateway device may be a set-top box located at a user's premises and to which the user has connected one or more external hard drives for storing content recordings (e.g., recorded content, saved content, content recordings, DVR content, etc.), such as television and video on demand programming, music, and the like.

The multiple hard drives and/or storage devices may be combined and partitioned using Redundant Array of Independent Disks (RAID) technology, thus providing a form of redundancy for stored content recordings and also enabling such content to be retrieved at higher speeds. Furthermore, utilizing multiple hard drives and/or other similar storage devices to store content recordings can increase or decrease the mean time between failure (MTBF) for such drives and devices while storing content redundantly increases fault-tolerance and eases content recovery in the event that one of the drives or devices fails.

Additional aspects of the disclosure relate to assigning priority levels to content recordings being stored on the internal drive of a gateway device and one or more external drives attached to the gateway device. In at least one arrangement, priority levels are assigned to content recordings such that higher value content can be stored in more locations and higher availability locations within the utilized drives. While the priority levels of stored content recordings are designed to correspond with identified and/or established user preferences with regard to the content, and thus minimize the need for users to manually allocate, reorganize or otherwise change the storage arrangement of content recordings between the various drives being utilized in conjunction with the users' gateway devices, as will be described herein, aspects of the disclosure nonetheless contemplate providing users with these and other operating capabilities.

Other aspects described herein relate to providing users with the ability to select one or more specific storage devices (e.g., hard drives) on which content recordings are to be stored. Users may make such a selection or designation of a storage location for content that is already recorded as well as content that the user has scheduled to be recorded in the future. In some arrangements where multiple drives (e.g., one or more external drives and the internal drive of a user's gateway device) are logically organized, combined and partitioned according to one of a variety of RAID configurations, instead of each drive being used as a separate partition or storage location, content recordings may span across multiple drives and/or be duplicated across the drives. It will be appreciated that the aforementioned could be applied to network storage locations including, but not limited to, dlna (digital living network alliance) shares within a user's premises, ftp (file transfer protocol) sites, etc. These and other aspects of the disclosure provide users with numerous capabilities in terms of controlling how and where recorded content is stored so as to reduce or eliminate situations where previously recorded content is no longer available to a user desiring to access such content.

Other aspects described herein relate to controlling and organizing the storage of content recordings between multiple drives used in connection with a gateway device such that an external drive may be removed from a first gateway device and attached to one or more other gateway devices. In this manner, a user is provided with the ability to transport an external drive containing stored content recordings between multiple different gateway devices such that the recordings may be accessed (e.g., viewed or displayed) by the user and/or by other users at different locations or user premises. In one example, this portability of the external drives may allow a user to remove an external drive from one gateway device (e.g., set-top box) located in the user's home and attach the drive to a second gateway device also located in the user's home or instead located at a home or other location associated with one or more other users.

Aspects of the disclosure may be provided in a computer-readable medium having computer-executable instructions to perform one or more of the process steps described herein.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein:

FIG. 3 is a chart illustrating example priority assignments for stored content according to one or more aspects described herein;

DETAILED DESCRIPTION

Figure 1:
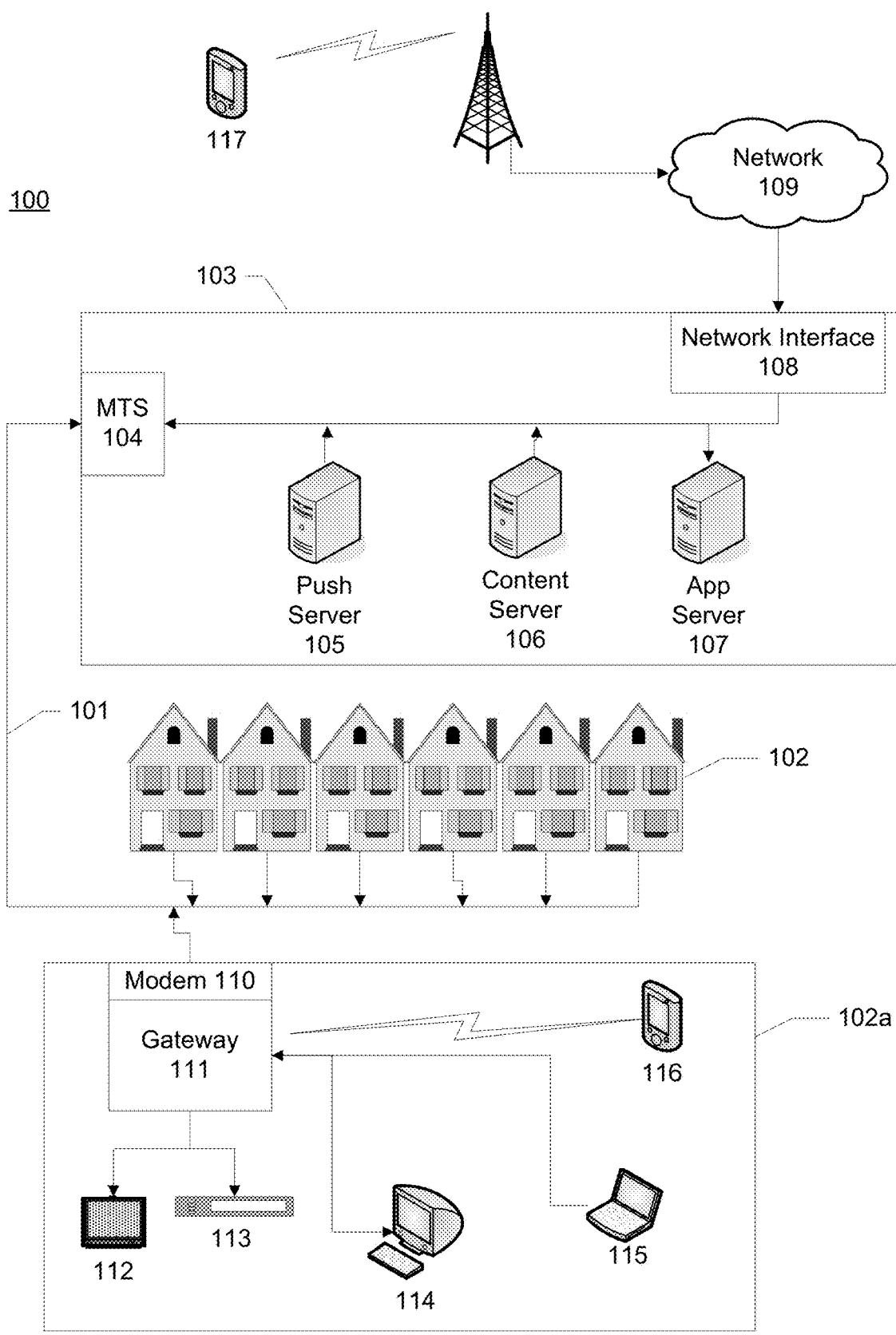
FIG. 1 illustrates an example information distribution network.

In the following description of various illustrative embodiments, reference is made to the accompanying drawings, which form a part hereof, and in which is shown by way of illustration various embodiments in which one or more aspects of the disclosure may be practiced. It is to be understood that other embodiments may be utilized and structural and functional modifications may be made without departing from the scope of the present disclosure.

By way of general introduction, aspects described herein relate to combining multiple memory devices such as hard drives and/or similar types of storage devices that may be connected, attached, or otherwise added to a gateway device (e.g., set-top box (STB), digital video recorder (DVR), computer server, etc.), and forming logical partitions among the drives to allow a user to control and organize the storing (e.g., recording, saving, duplicating, storing, etc.) of content recordings based on different priority levels assigned to the recordings. In one example, the gateway device may be a set-top box located at a user's premises to which the user has connected one or more external hard drives for storing content recordings (e.g., recorded content, saved content, content recordings, DVR content, etc.), such as television and video on demand programming, music, and the like.

Additional aspects described herein relate to implementing Redundant Array of Independent Disks (RAID) technology to store content recordings across multiple storage devices (e.g., hard drives, data disks, etc.), thus providing a form of redundancy for stored content recordings and also enabling such content to be retrieved at higher speeds. Utilizing multiple hard drives or other similar storage devices to store content recordings may increase the mean time between failure (MTBF) for such drives and devices while storing content redundantly increases fault-tolerance in the event that one drive or device fails. Such arrangements also allow for easier recovery of content recordings that may be lost during the failure of a storage drive or device. In at least some arrangements described herein, using RAID with multiple hard drives includes partitioning each drive's storage space, such that numerous logical partitions may be formed between, for example, an internal hard drive of a gateway device and one or more external hard drives connected or attached to the gateway device.

As will be further described herein, a user (e.g., client, customer, viewer, subscriber, individual, etc.) may be provided with a variety of options for storing recorded content in the partitions of particular hard drives or storage devices being used in connection with the user's gateway device. In one arrangement, a user may designate a specific location (e.g., one of the external hard drives, one of multiple partitions of the internal drive, etc.) on which recorded content, whether already recorded or scheduled to be recorded in the future, should be stored. For example, when a user is setting-up a recording of content the user may be presented with numerous selectable options such as the recording start time, the length of time for the recording, whether the user wishes to repeat the recording when the content is available again in the future, and the like. According to aspects described herein, the user may also be presented with options regarding where the recorded content should be stored for future use and/or access by the user. For example, the user may select to have the recorded content stored only on an internal hard drive of the gateway device, on both the internal hard drive and one or more external hard drives attached to the gateway, on one or more of the external hard drives but not on the internal drive, or a variety of other arrangements depending on the number and/or type of external storage devices being utilized.

In addition to the numerous options that may be presented to a user when setting-up a content recording, a few of which are briefly described above, a variety of information may also be made available to the user for content that has already been recorded and is being stored on one or more storage devices or drives. For example, a user may be provided with certain information regarding priority levels assigned to stored content recordings. Based on the priority levels of the recordings, the user may decide to reorganize how the recordings are stored among the various storage drives being used, or change which recordings remain stored versus being replaced by higher priority content.

While in some arrangements described herein the priority levels of stored content are designed to correspond with identified and/or established user preferences with regard to recorded content, and thus minimize the need for users to manually allocate, reorganize or otherwise change the storage of recorded content between the various drives being utilized in conjunction with the users' gateway devices, such arrangements nonetheless contemplate providing users with these and other operating capabilities. Aspects described herein relate to providing users with numerous capabilities in terms of controlling how and where recorded content is stored among the particular storage devices (e.g., hard drives) involved so as to significantly reduce or eliminate situations where previously recorded content is no longer available to a user desiring to access such content. For example, a user who has recorded content from his or her gateway device may wish to transport that recorded content to one or more other gateway devices for additional access, such as a different gateway device located at the user's premises, a gateway device located at another (e.g., friend's or relative's) premises, etc. If the user determines that the desired content recording is only stored on the internal drive of the user's gateway device, the user may move the content recording from the internal drive to an external drive attached to the gateway device, make a duplicate copy of the content recording and store the duplicate on the external drive, and/or otherwise control or change the storage location of the content recording between the user's available internal and external drives.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a modem termination system (MTS) 104, such as a cable modem termination system (CMTS), which may be a computing device configured to manage communications between devices on the network of lines 101 and backend devices such as servers 105-107 (to be discussed further below). The MTS may be as specified in a standard, such as the Data Over Cable Service Interface Specification (DOCSIS) standard, published by Cable Television Laboratories, Inc. (a.k.a. Cable-Labs), or it may be a similar or modified device instead. The MTS may be configured to place data on one or more downstream frequencies to be received by modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for receiving user remote control commands, and processing them to provide an intelligent remote control experience.

An example home 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
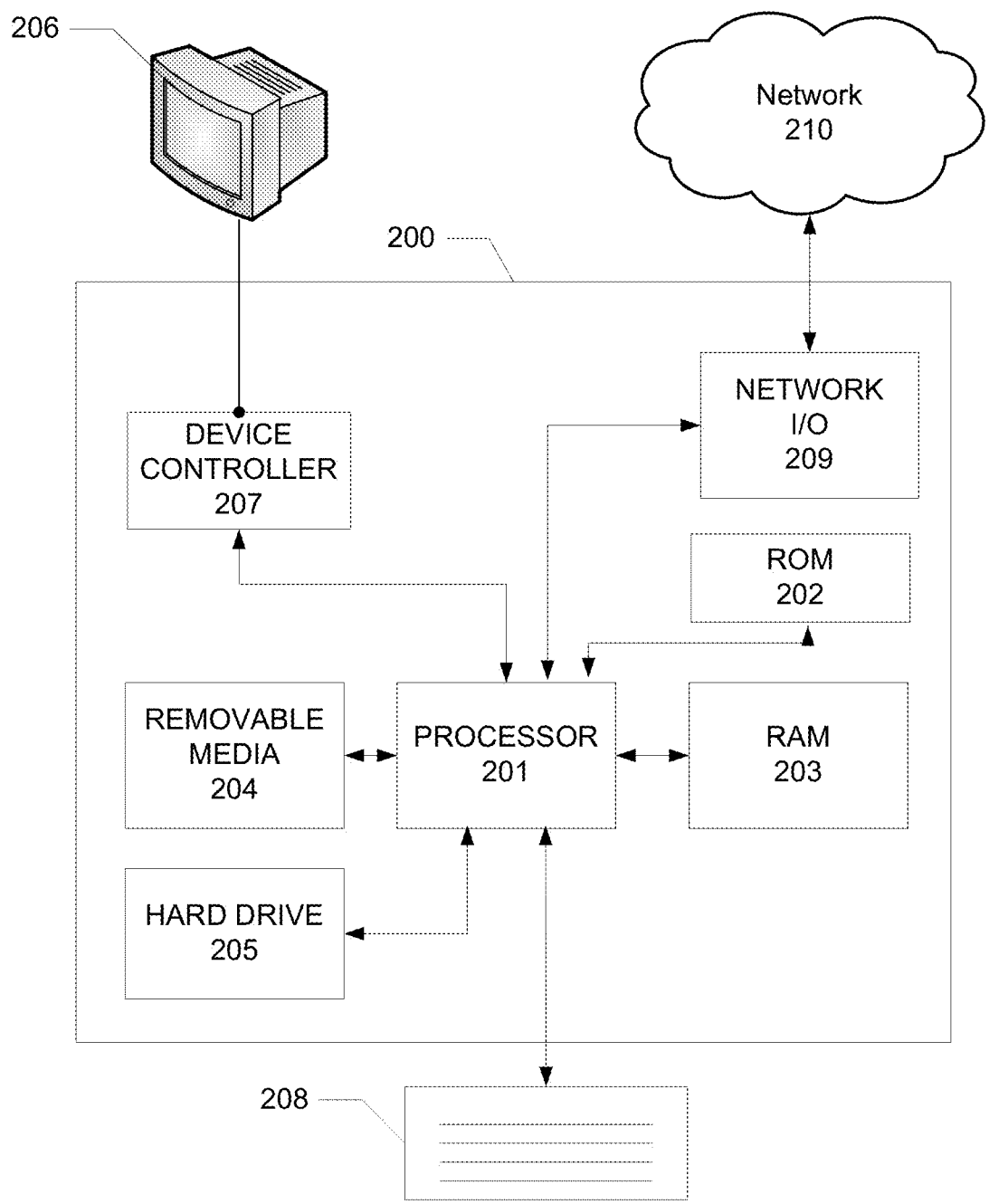
FIG. 2 illustrates an example hardware platform on which the various elements described herein may be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

The steps described below and illustrated in the accompanying Figures may be implemented by one or more of the components in FIGS. 1 and 2 and/or other components, including other computing devices.

FIG. 3 provides a chart identifying priority levels associated with different types (e.g., categories, classifications, groups, types, etc.) of content recordings that may be stored in one or more memory devices such as hard drives (e.g., hard drive 205 shown in FIG. 2) utilized in connection with a gateway device (e.g., gateway device 111 shown in FIG. 1) at a user's premises or home (e.g., home 102a in FIG. 1). Generally an external storage device that is attached, connected, or otherwise added to a gateway device (e.g., set-top box (STB), digital video recorder (DVR), computer server, etc.) by a user desiring to increase storage capacity for storing content recordings will be larger than the internal memory of the gateway device.

As will be described in greater detail below, aspects of the disclosure relate to assigning priority levels to content recordings being stored on the internal drive of a gateway device and one or more external drives attached to the gateway device based on intelligent recognition of various attributes of the content recordings. For example, in at least one arrangement, priority levels are assigned to content recordings such that higher value content can be stored in more locations and higher availability locations within the utilized drives. In the following description, a lower priority number translates to a higher value being placed on the content (e.g., content recordings with priority numbers of 1 or 2 are considered more valuable to users than content recordings with priority numbers of 5 or 6). It should be understood, however, that the example priority numbers and example descriptions of the different types of stored content recordings used in explaining the various aspects of the disclosure herein are not intended to limit the scope of the present disclosure in any way and numerous other combinations and variations of priority schemes and content descriptors may be used in addition to or instead of those mentioned.

As shown in FIG. 3, a priority level of "6" may be assigned to "Live Buffer" 305 which is content that is only stored while the gateway device is powered-on and tuned to a particular channel or frequency for receiving content. For example, when a user changes from a first channel to a second channel, the buffer is deleted and a new buffer is started for the second channel. As such, Live Buffer content 305 may be assigned priority level 6, indicating that it is not very highly valued by the user. "Duplicate" content 310 is the second copy of content already stored or recorded in another location on at least one other drive because the at least one other drive has storage space available for such content. However, as soon as additional storage space becomes needed on the other drive, Duplicate content 310 will be the first to be replaced or recorded over by other non-duplicate content or higher-priority duplicate content. Duplicate content 310, in at least the present example, may be assigned a priority level of "5" while the "first" or other copy of the Duplicate content 310 may have a priority level of 1-4, which will be described in greater detail below. Stored content recordings with a priority level of "4" may be considered "About to be Deleted" content 315, which includes some of the oldest content recordings still being stored on the drives. Such content recordings are assigned a priority level of 4 because they are considered to be recordings that a user would most likely delete next in order to make space for new content recordings. Content recordings assigned priority levels of 4-6 are, in one or more arrangements, considered to be of low value to the user and the strength of their priority level continues to diminish as additional stored content recordings are accorded higher priority levels. In certain instances About to be Deleted content 315, i.e., priority level 4 content, may not always transition to Duplicate or priority level 5 content.

"Accessed and Not Accessed Older" content 320 is assigned a priority level of "3" since such content is considered to be of medium value to users as it includes content recordings that have been stored for some period of time less than the "About to be Deleted" content 315. In one or more arrangements, Accessed and Not Accessed Older content 320 (e.g., watched and unwatched older content, viewed and unviewed older content, opened and unopened older content, etc.) is assigned a priority level of 3 because content that is accessed by a user is less likely to be accessed again, and content not yet accessed by a user after being stored for some period of time (e.g., two weeks) is unlikely to be accessed at all. In other schemes Accessed content and Not Accessed Older content may be divided into two different categories with differing priority levels. "Not Accessed Newer" content 325 is assigned a priority level of "2" because it includes some of the most valuable content to users and is likely to be accessed very soon. Lastly, the highest priority content recordings, which are assigned a priority level of "1," include the "Do Not Delete" content 330. Do Not Delete content 330 is comprised of content recordings that the user considers to be of the highest value and importance. Therefore, in at least some arrangements, Do Not Delete content recordings 330, regardless of the length of time they have been stored for, are not deleted or otherwise removed from the internal hard drive of the user's gateway device unless the user explicitly instructs such content recordings be deleted or removed. Such content may be set by the user to be "Do Not Delete" content when a user requests content to be recorded or by the user setting the content to be "Do Not Delete" after it has been recorded. Still other implementations may have certain types of content be automatically recorded based on preset user preferences. Also, certain types of content could be set to Do Not Delete based on an event (e.g., passage of one week, until a newer episode of the content were recorded, until the content was viewed, etc.) and then after the event occurs the priority level would then automatically change.

As mentioned, the example descriptions and priorities associated with stored content recordings illustrated in FIG. 3 and described in the above paragraphs constitute only one of the many possible ways of prioritizing, categorizing and organizing stored content. It is to be appreciated that stored content recordings have numerous other attributes and/or characteristics that may serve as bases for assigning priorities in addition to or instead of those described above, and also that more or fewer than six priority levels may be assigned to stored content recordings, depending on the amount of detail desired to be taken into consideration. For example, in one or more other arrangements, stored content recordings may be assigned priority levels that additionally and/or alternatively consider or otherwise take into account one or more of the following: type of content (e.g., television program, video on demand movie, Internet video clip or download, music, etc.); genre or theme associated with the content (e.g., drama, thriller, sports, news, children, family, opera, classic rock, etc.); affiliation (e.g., television network, film/movie studio, media company, record label, etc.); availability of similar or comparable alternatives (e.g., television program also currently available through video-on-demand, movie scheduled to be continuously available for some extended period of time, live event or performance that can also be downloaded via the Internet, etc.); popularity, quality and/or format of content (high-definition, standard-definition, mp3, etc.); and various recording attributes (e.g., start/end time of content availability for recording, duration of content, day of week, etc.).

Additionally, many actions related to assigning priority levels to content recordings may be performed not as immediate responses to user input or selection, but instead as the result of intelligent recognition of various attributes of stored content recordings. For example, various aspects of the disclosure that will be further described herein relate to identifying certain characteristics of stored content recordings and associating those characteristics with one or more priority levels. As such, priorities assigned to content recordings may be system-driven as well as user-driven. For example, some arrangements may include a user-interface through which a user may "rank" or otherwise indicate preferences for certain types of content recordings that should be considered high-priority and therefore assigned priority levels accordingly.

Furthermore, in other arrangements, content recordings may be prioritized, in part, based on whether the priority levels assigned to them were user-requested or system-generated. For example, there may be instances where a content recording with a priority level intelligently assigned to it by the system is actually less valuable than a different content recording that was assigned a priority level based on a user's input, yet the system-generated priority level is higher than the user-driven priority level, thus making the content recording with the user-driven priority level potentially susceptible to being lost or removed from storage. Accordingly, to avoid this possibility content recordings may be prioritized and/or reprioritized based not only on their assigned priority level, but also on whether or not their priority level was assigned by the user or intelligently generated by the system.

FIGS. 4A-4D illustrate example arrangements of using multiple memory devices such as hard drives to store content recordings according to various aspects described herein. Shown in each of FIGS. 4A-4D is an internal drive 405 and an external drive 410 that may be combined, partitioned or otherwise utilized in numerous ways to provide a variety of alternatives and options for storing content. As will be described in greater detail below, FIGS. 4A-4D illustrate four example alternatives for utilizing an external storage device or hard drive 410 in conjunction with an internal hard drive 405 of, for example, a gateway device (e.g., gateway device 111 shown in FIG. 1) at a user's premises, to organize and maintain stored content recordings of the user in an intelligent and efficient manner. While some of the arrangements illustrated in FIGS. 4A-4D and described in greater detail in the paragraphs that follow include drives combined using various Redundant Array of Independent Disks (RAID) configurations, other arrangements also illustrated and described do not implement RAID technology which, as will be further explained herein, changes the amount of control users have over allocating available storage space for priorities of content recordings. Additionally, it should be understood that FIGS. 4A-4D illustrate only a few example combinations and partitions of hard drives that may be used in accordance with various aspects of the present disclosure, and numerous other combinations and arrangements of hard drives may also be used in addition to or instead of those illustrated. For example, two or more external hard drives or storage devices may be combined and/or partitioned in ways similar to those shown in FIGS. 4A-4D, and such hard drives may include additional or fewer partitions of varying size.

As mentioned above, one or more aspects of the present disclosure relate to storing content recordings across multiple storage devices (e.g., hard drives) using RAID technology and various RAID configurations. Utilizing RAID to store content recordings allows for advantages that vary depending on how RAID is implemented in any given system including, but not limited to, increased protection of data stored in the drives and faster performance in terms of accessing and otherwise handling the stored data. Implementing RAID results in two or more physical drives, disks, etc. being combined to form what is often referred to as an array. Although comprised of two or more physical drives, an array (e.g., container, virtual drive or disk, array, etc.) appears to the host system (e.g., gateway device 111 shown in FIG. 1) as though it is a single drive or storage device.

Figure 4A:
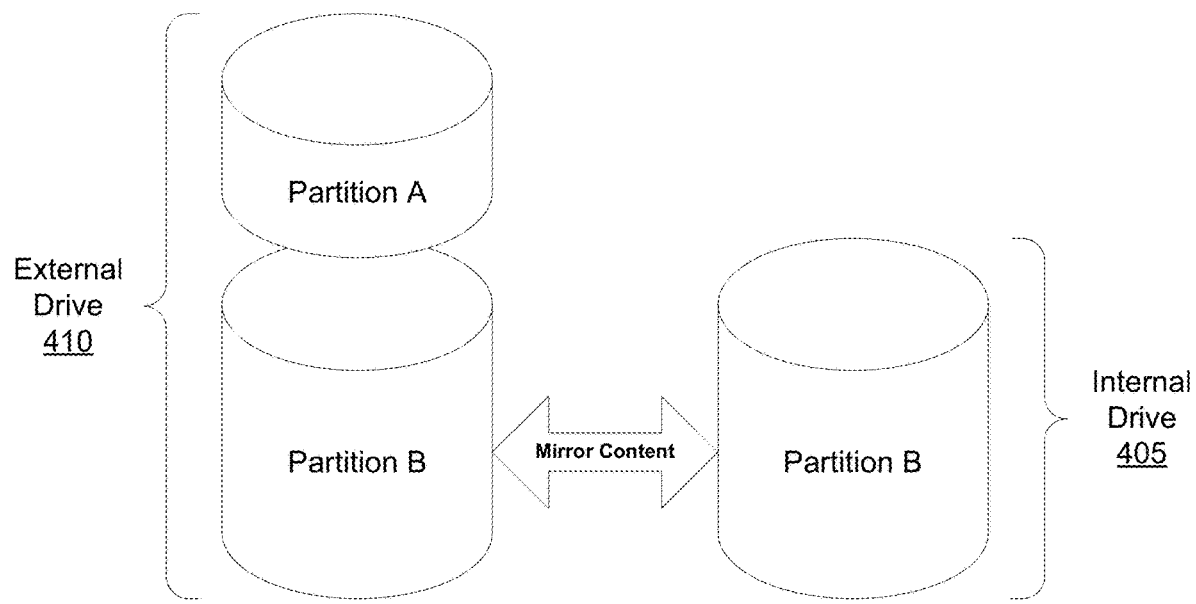
FIG. 4A is a schematic diagram illustrating an example of combining and partitioning memory devices according to one or more aspects described herein.

FIG. 4A illustrates an example arrangement of storing content recordings in which an internal and an external hard drive are combined using RAID 1 (e.g., level 1 RAID configuration) to store and duplicate content recordings. Shown in FIG. 4A is an internal drive 405, which may be an internal hard drive of a gateway or another device (e.g., a STB, DVR, etc.), and an external drive 410 that may be attached or otherwise connected to such a gateway device to provide additional and/or redundant storage space for recording content. In many RAID configurations the drives default to the size of the smallest drive in the array. Therefore, in accordance with aspects described herein, external drive 410, which is the larger of the two drives, may be logically partitioned into two regions or sections for storing content recordings. As illustrated, external drive 410 includes "Partition A" and "Partition B," with internal drive 405 also having a "Partition B" that is identical to that of external drive 410. As will be described in greater detail below, forming partitions within external drive 410, one of which (e.g., Partition B) is identical to the entirety of internal drive 405 allows for complete redundancy of content recordings stored on internal drive 405 such that a backup copy of the content recordings stored in internal drive 405 is available for recovery from Partition B of external drive 410 in the event that internal drive 405 fails, becomes damaged or otherwise loses its stored content.

As indicated in FIG. 4A by the "Mirror Content" arrow shown between Partition B of internal drive 405 and Partition B of external drive 410, using RAID 1 mirrors content recordings to both internal drive 405 and external drive 410. In this manner, content recordings stored in Partition B of one drive can be duplicated in corresponding Partition B of the other drive so that, for example, if external drive 410 is ejected, unplugged, or otherwise removed from a device in which internal drive 405 is contained, no content recordings on Partition B will be lost or unavailable to a user wishing to access such recordings from either drive, but content recordings on Partition A will not be available to a user accessing Partition B of internal drive 405 as those content records are not mirrored content. For example, a user may access recorded content stored in Partition B of internal drive 405 through a first device that contains internal drive 405 even if external drive 410 is not connected or attached to the first device. Similarly, a user may access the same recorded content stored in Partition B of external drive 410 through a second device to which external drive 410 may be attached or connected to even if the second device includes an internal hard drive that has stored thereon content recordings different from those stored in Partition B of external drive 410. As such, in one example, content recordings stored in Partition A and/or B could be moved to other devices (e.g., additional STBs 113 in FIG. 1) by transporting external hard drive 410 and connecting the external device to one of the other devices. In at least one arrangement, firmware and/or code objects stored on either of the hard drives can be placed in Partition B so that they are redundant and may quickly and easily be recovered if necessary.

Figure 4B:
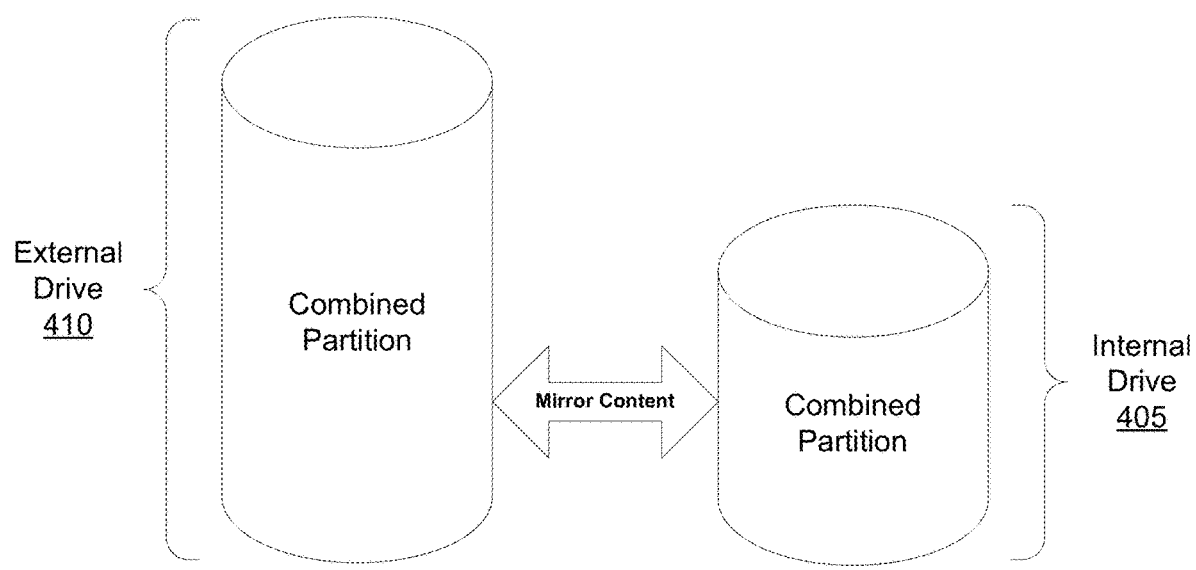
FIG. 4B is a schematic diagram illustrating an example of combining and partitioning memory devices according to one or more aspects described herein.

FIG. 4B illustrates an alternative arrangement of hard drives that may be used in accordance with one or more aspects of the present disclosure wherein one logical volume is created between the drives used for storing content recordings. Similar to FIG. 4A, the example arrangement shown in FIG. 4B includes internal drive 405, which again may be an internal hard drive of a gateway or another device (e.g., a STB, DVR, etc.), and external drive 410 that may be attached or otherwise connected to such a gateway device to provide additional storage space for recording content. There are several different options with the arrangement of internal drive 405 and external drive 410 shown in FIG. 4B. For example, internal drive 405 and external drive 410 can each have one large partition that is logically combined with the other partition, without RAID, to allow a user to manually determine how to apportion storage space between the combined drives. When an internal drive 405 is combined with an external drive 410, there is no redundancy. For example, logically combining an internal drive of 100 GB with an external drive of 200 GB into one partition without RAID provides 300 GB of memory no redundancy in that the content is not mirrored.

In another configuration, the external drive 410 may be divided into two partitions like FIG. 4A, but with partition B being subject to RAID 0. RAID 0 is logically similar to combining the internal drive 405 and external drive 410, but not exactly the same. For example, if an external drive 410 is ejected from RAID 0, all the content stored therein is lost or unavailable. Whereas if the two partitions are simply logically combined and one of the partitions of the external drive 410 is ejected, only the data stored on the ejected partition is lost.

As shown in FIG. 4B, each of internal drive 405 and external drive 410 has a "Combined Partition" such that one logical volume of storage space is formed between the drive. In at least one arrangement, new content recordings are initially stored on internal drive 405. Then at some later point in time (e.g., at night, when the gateway device is not in use or is in "standby" mode, etc.), content recordings stored on internal drive 405 may be mirrored to external drive 410 to provide at least some degree of backup or redundancy for purposes of aiding in recovery of lost content during drive failure, allowing for portability of stored content recordings to other gateway devices, and the like. The mirroring between internal drive 405 and external drive 410 is illustrated by the "Mirror Content" arrow shown between the drives. In this example, user space applications may have difficulty determining where data is stored in that this configuration appears like one big drive to the application. In such a case, it would be preferable for each drive to have one partition of its full size.

Under the arrangement of FIG. 4B, once internal drive 405 reaches capacity in terms of storing content recordings, any duplicate or backup copies of lower priority content may be automatically or manually removed from internal drive 405 while remaining stored on external drive 410. As such, internal drive 405 is able to maintain adequate storage space for higher priority content recordings while external drive 410 (assuming such external drive is larger than the internal drive), in addition to continuing to receive mirrored higher priority content recordings from internal drive 405, also maintains certain lower priority content that is no longer being stored on the internal drive. It is to be appreciated that, as with the arrangement of drives shown in FIG. 4A, the arrangement shown in FIG. 4B may include one or more additional external drives that may be utilized in conjunction with internal drive 405 in a manner similar to that described above. With this configuration, user space applications may have difficulty determining where data is stored. In such a case, it would be preferable for each drive to have one partition of its full size.

Figure 4C:
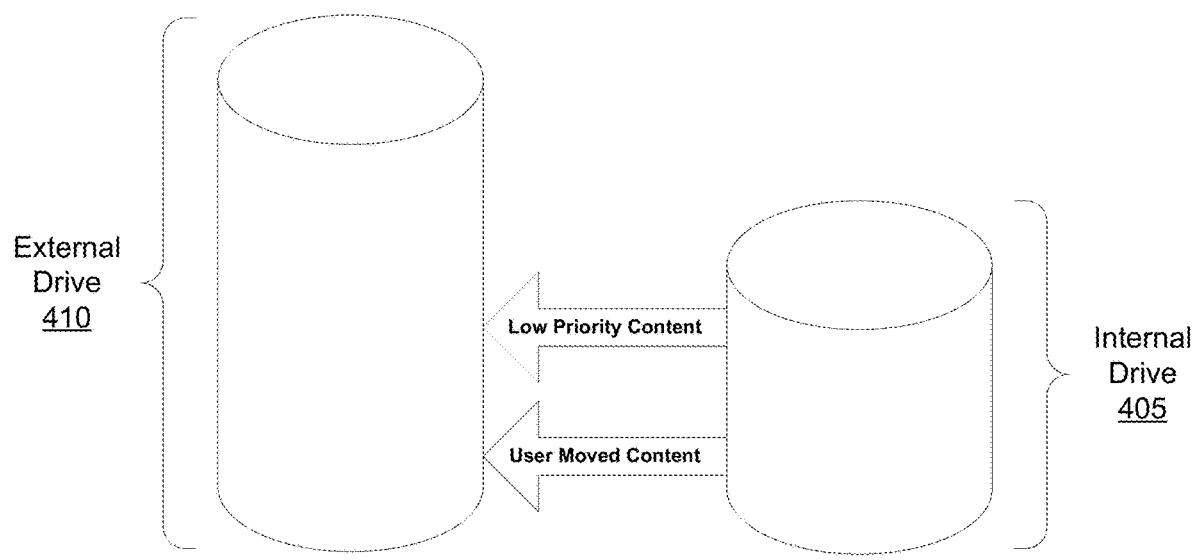
FIG. 4C is a schematic diagram illustrating an example of using multiple memory devices for storing content according to one or more aspects described herein.

FIG. 4C illustrates an additional arrangement of hard drives that may be used in accordance with various aspects described herein. As with the arrangements illustrated in FIGS. 4A and 4B, the example arrangement shown in FIG. 4C similarly includes an internal drive 405 and an external drive 410, where internal drive 405 may be an internal hard drive of a gateway device and external drive 410 may be attached or otherwise connected to the gateway device for additional storage space for content recordings. Unlike the other arrangements described above, FIG. 4C shows internal drive 405 and external drive 410 being used as entirely separate partitions for storing content recordings. Accordingly, RAID is not used to combine the drives and provide any redundancy or backup, and each drive maintains its own separate partition. Such an arrangement as that illustrated in FIG. 4C provides users with the most control over how and where content recordings are stored and also provides the largest amount of overall storage space since stored content is not mirrored between drives.

In at least one example, the highest priority content recordings are stored on internal drive 405 and transitioned to external drive 410 when internal drive 405 reaches its storage capacity. In such an example, the transitioned content recordings are likely to be the lower priority content, as shown in FIG. 4C by the "Low Priority Content" arrow flowing from internal drive 405 to external drive 410. Additionally, as indicated by the "User Moved Content" arrow flowing from internal drive 405 to external drive 410, the arrangement of drives shown in FIG. 4C also allows a user to manually move stored content recordings from internal drive 405 to external drive 410, for example, if the user desires to transport such content recordings for use on one or more other gateway devices. Similarly, additional external drives may also be used in conjunction with those shown in FIG. 4C, and such additional drives may be used either in the same manner as that described above or instead may be used in one or more of the alternative ways described herein.

Figure 4D:
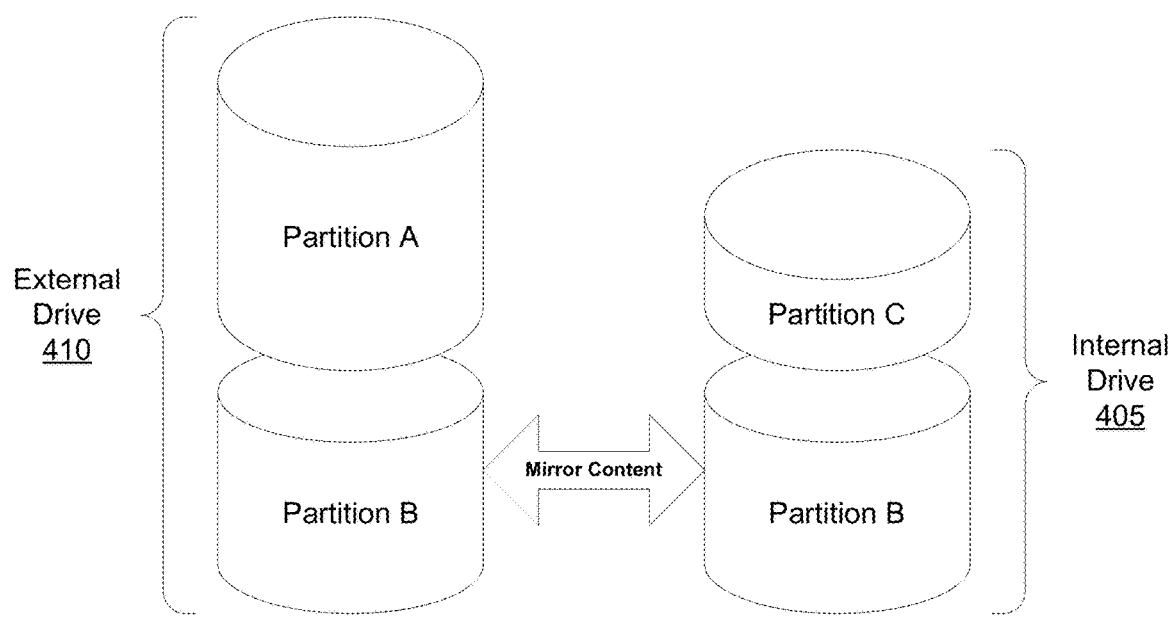
FIG. 4D is a schematic diagram illustrating an example of combining and partitioning memory devices according to one or more aspects described herein.

FIG. 4D illustrates another example arrangement of storing content recordings across multiple drives or storage devices contained within or connected to a gateway device. As with FIGS. 4A-4C, the arrangement shown in FIG. 4D includes an internal drive 405 and external drive 410, but further illustrates that RAID partitions between the drives may be varied in one or more ways such that the partitions do not need to be as large as the smallest partition of external drive 410.

Similar to the arrangement shown in FIG. 4A, in FIG. 4D, a RAID 1 partition may be setup between internal drive 405 and external drive 410 to provide redundancy, as indicated by the "Mirror Content" arrow located between the "Partition B" of each drive. However, unlike the arrangement shown in FIG. 4A, the entire storage capacity of the smaller internal drive 405 is not utilized by such RAID partitioning. Instead, as shown by the "Partition C" portion of internal drive 405 and the "Partition A" portion of external drive 410, a smaller percentage of each of the drives is used for redundancy of stored content recordings. Both internal drive 405 and external drive 410 may be partitioned such that each drive has at least some portion (e.g., Partition A of external drive 410 and Partition C of internal drive 405) in which content recordings are stored but not mirrored to a corresponding portion on the other drive.

In one example, only the highest priority content recordings are stored in Partition B of each drive to ensure redundancy, while Partitions C and A may be used for lower priority content recordings. For example, with reference to the priority level chart illustrated in FIG. 3, content recordings with a priority level of "3" or less may be stored and duplicated in Partition B on each drive while Partition A and Partition C are used for stored content recordings of lower priority such as priority level "4" and higher. In other arrangements, Partitions A and B may be used for storing content recordings that a user wishes to have available for transport to one or more other gateway devices. Another factor to consider in determining how to store content recordings would be drive bandwidth/speed. For example, a RAID 0/1 drive can read faster than non-RAID logical partitions. As such, for live buffer content, it may be advantageous or important to store live buffer content in storage for faster reading and much less of a concern to store the content redundantly. Various aspects related to the use of external drives (e.g., external drive 410) as portable storage devices will be described in greater detail below.

Figure 4E:
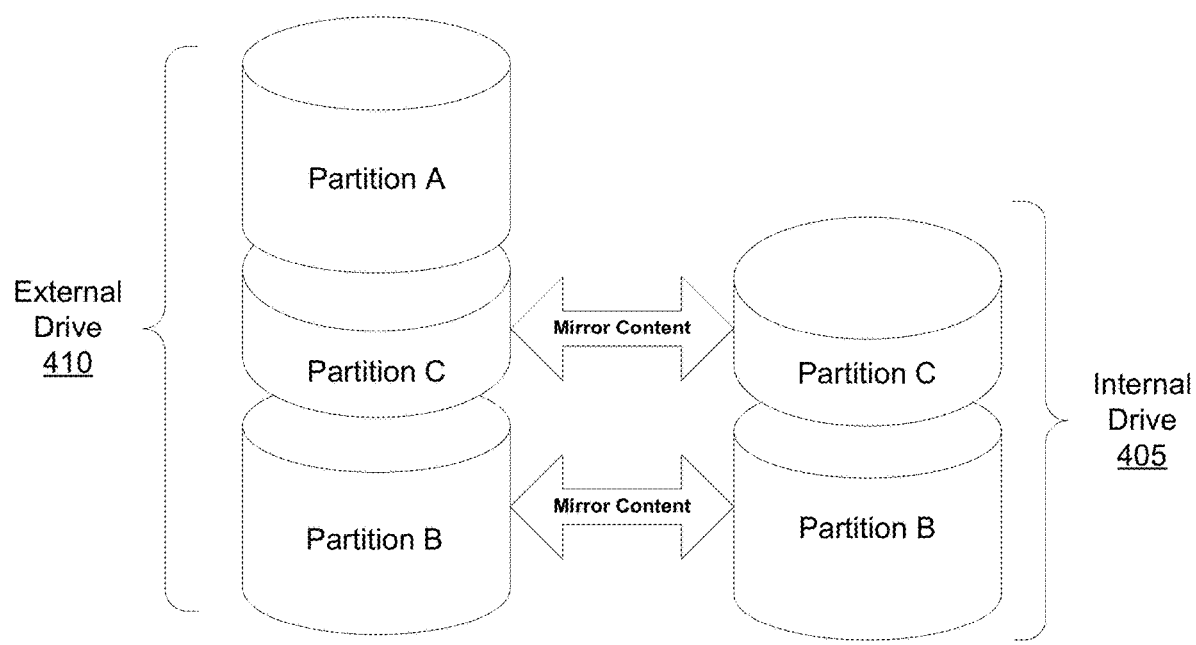
FIG. 4E is a schematic diagram illustrating an example of combining and partitioning memory devices according to one or more aspects described herein.

According to another example illustrated in FIG. 4E, the external drive 410 in FIG. 4D includes two partitions B and C that match partitions B and C of the internal drive 405. For example, internal drive 405 could include partition B and partition C having storage capacities of 50 GB and 100 GB, respectively. In external drive 410, partitions A, B and C could have storage capacities of 200 GB, 50 GB and 100 GB, respectively. In this example, partition A would function as its own logical partition not directly linked with anything such that content would be transitioned slowly to that volume. Whereas, partition B on each of the drives could be linked together as a RAID 0 array providing 100 GB of high speed, non-redundant storage and partition C on each of the drives could be linked to together as a RAID 1 array providing 100 GB of redundant, high bandwidth storage. Based on this arrangement of storage volumes, the content priority levels can be set to map the content to partitioned storage volumes consistent with the particular priority levels of the content.

Figure 5:
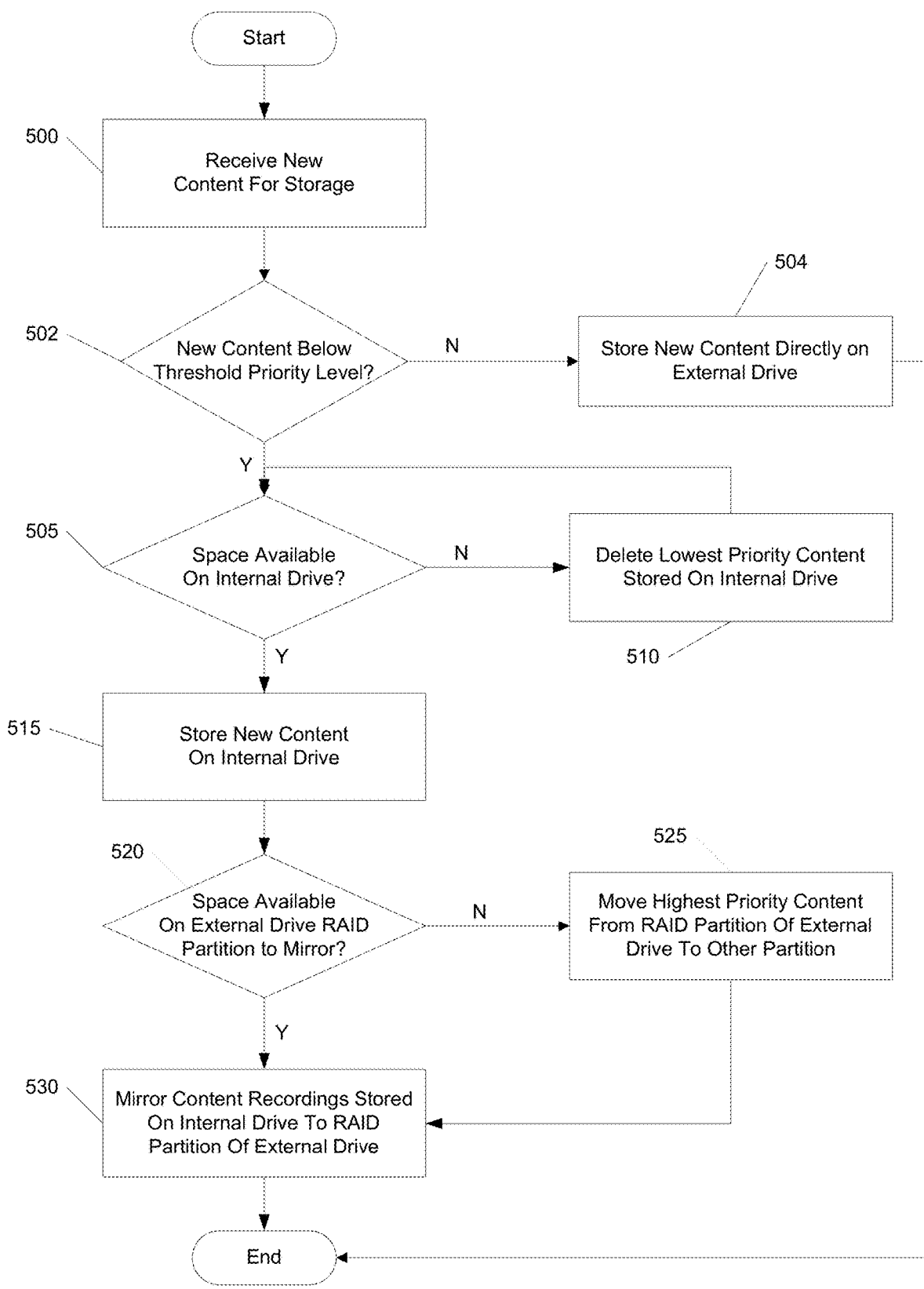
FIG. 5 is a flowchart illustrating an example method of storing and mirroring content recordings across multiple memory devices intelligently combined and partitioned according to one or more aspects described herein.

FIG. 5 is a flowchart illustrating an example method for storing and mirroring of content across multiple drives, intelligently combined, and partitioned according to various aspects described herein. The flowchart shown in FIG. 5 is based, for example, on an arrangement of memory devices such as that illustrated in FIG. 4A, where the entire storage space of the internal drive (e.g., internal drive 405) determines the size of the corresponding RAID partition of the external drive (e.g., external drive 410) onto which content recordings may be mirrored from the internal drive as described herein. The process begins at step 500 with a new content for storage being received by the system. In step 502, it is determined whether the new content being recorded is high priority that is below a threshold priority level (e.g., level 4). If so, in step 505 it is determined whether there is space available on the internal drive for storing the new content. If insufficient space is available on the internal drive, then in step 510 the lowest priority content stored on the internal drive may be deleted until space becomes available for storing the new content in step 515. If in step 502 the new content being recorded is determined to be of low priority for some reason, e.g., duplicate content, and does not exceed a particular priority number, the content could be stored directly on the external drive 410 in step 504 and would soon be available on external drive 410 as needed.

The process continues to step 520 where it is determined whether there is space available on the RAID partition of the external drive (e.g., "Partition B" of external drive 410 shown in FIG. 4A) to mirror all the content recordings stored on the internal drive. If there is not enough available space on the RAID partition of the external drive, then in step 525 the highest priority content recordings stored in the RAID partition is moved to the other, non-RAID partition of the external drive (e.g., "Partition A" of external drive 410 shown in FIG. 4A) until space becomes available to mirror all of the content recordings from the internal drive. In one or more arrangements, the system determines which of the highest priority content recordings stored in the RAID partition of the external drive are not also stored on the internal drive, and thus will not be mirrored on the external drive, and selectively moves these content recordings into the non-RAID partition. As such, any high-priority content recordings stored only on the external drive are not lost on the external drive when, in step 530, the content recordings stored on the internal drive are mirrored to the RAID partition of the external drive.

Figure 6:
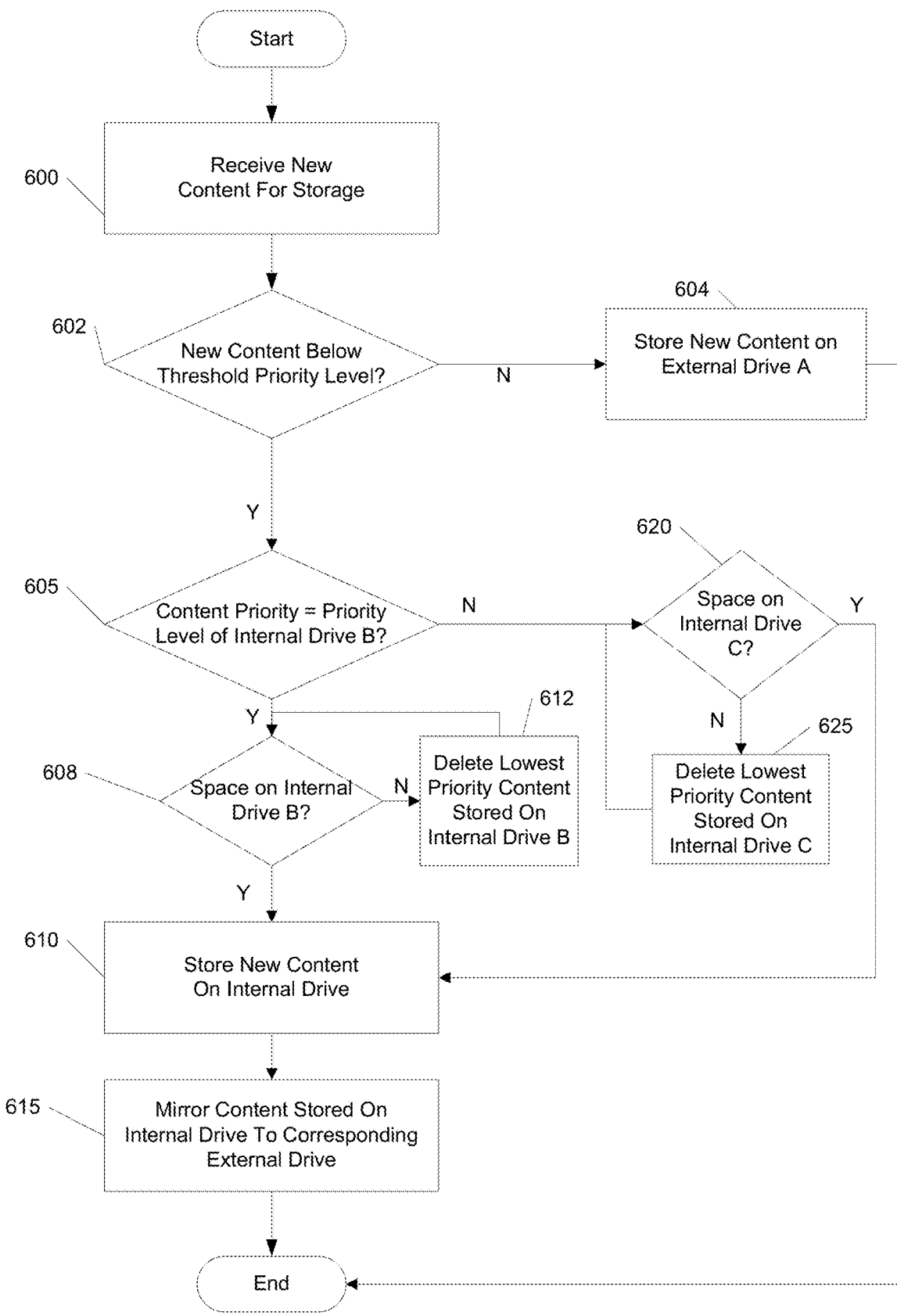
FIG. 6 is a flowchart illustrating another example method of storing and mirroring content recordings across multiple memory devices intelligently combined and partitioned according to one or more aspects described herein.

FIG. 6 is a flowchart illustrating an alternative example method of storing and mirroring content across multiple memory devices intelligently combined and partitioned. The flowchart shown in FIG. 6 corresponds with an arrangement of drives, for example, similar to that illustrated in FIG. 4E. The balance of the external drive not used for mirrored content stores low priority content, which may be non-redundant and may have been deleted from the internal drive. The process shown in FIG. 6 begins at step 600 with new content being received by the system. In step 602, it is determined whether the new content is high priority that is below a particular priority level (e.g., below level 4). If so, in step 605 it is determined whether the priority level is equivalent to level 1 corresponding to the highest priority content, which is stored in internal drive B. If so, in step 608, it is determined whether there is space available on the internal drive B for storing the received content. If there is sufficient space found on the internal drive in step 608, then in step 610 the new content is stored, in this instance on the internal drive B. On the other hand, if it is determined in step 608 that insufficient space is available on the internal drive B, then in step 612 the lowest priority content stored on the internal drive B is deleted. Steps 608 and 612 may be repeated until space becomes available on the internal drive B for storing the new content in step 610.

If in step 602 the new content is determined to be of low priority and at or above a particular priority level, the new content is stored directly in the non-redundant area of the external drive A in step 604. If the external drive A is full, the lowest priority content on that can be deleted. After step 604, the process ends.

If in step 605, the priority level is not the highest priority, then it is determined in step 620 whether there is space available for the new content on internal drive C. If there is sufficient space found on internal drive C in step 620, then in step 610 the new content is stored, in this instance on the internal drive C. On the other hand, if it is determined in step 620 that insufficient space is available on the internal drive C, then in step 625 the lowest priority content stored on the internal drive C is deleted. Steps 620 and 625 may be repeated until space becomes available on the internal drive C for storing the new content in step 610.

Once the new content has been stored on the internal drive in step 610, then the process continues to step 615 where the content recordings stored on the internal drive are mirrored onto the corresponding external drive. As such, the combined drives provide a form of redundancy which, for example, may help in recovering lost content recordings that result from drive failure, accidental erasure, etc. In addition, a dedicated internal drive (B) that is mirrored is provided for the highest priority content recordings. Also, the non-redundant drive A can be set up so to store the deleted content recordings from external drive, external drive C, both external drives B and C or neither external drive B nor external drive C. It will be appreciated that many permutations and configurations can be implemented.

Figure 7:
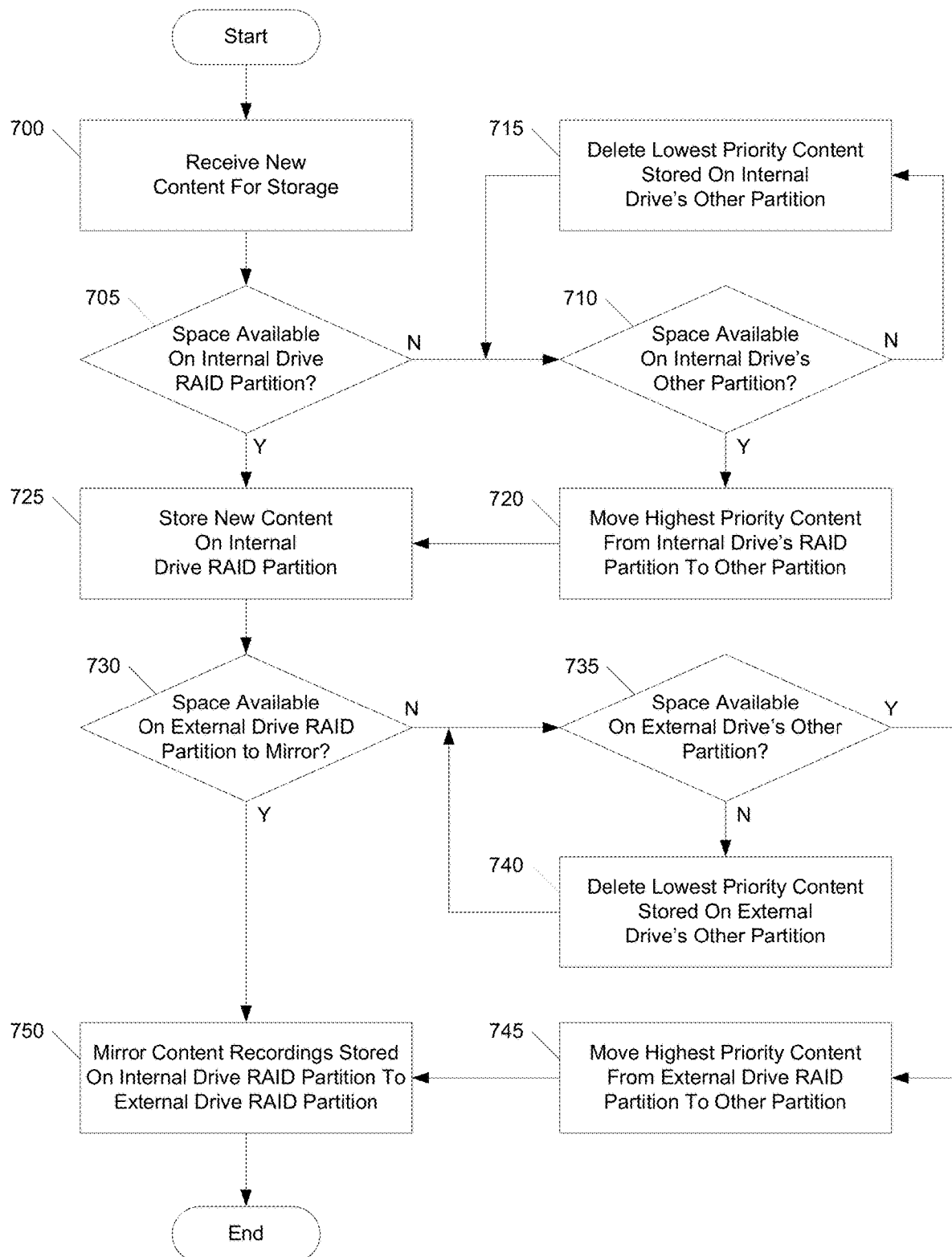
FIG. 7 is a flowchart illustrating still another example method of storing and mirroring content recordings across multiple memory devices intelligently combined and partitioned according to one or more aspects described herein.

FIG. 7 is a flowchart illustrating another alternative method of storing and mirroring content (e.g., recordings) across multiple memory devices intelligently combined and partitioned. The flowchart shown in FIG. 7 corresponds, for example, with an arrangement of drives similar to that illustrated in FIG. 4D. As shown in FIG. 4D, each of the internal and external drives has a RAID partition of identical size to the other (e.g., "Partitions B" of internal drive 405 and external drive 410 shown in FIG. 4D) along with second or other partitions that are not necessarily the same size (e.g., "Partition C" of internal drive 405 and "Partition C" of external drive 410 shown in FIG. 4D).

The process begins at step 700 with a new content for storage being received by the system. In step 705 it is determined whether there is space available on the internal drive's RAID partition for storing the received content. Although not illustrated in FIG. 7, a step analogous to step 502 may be added between steps 700 and 705 in which it is determined whether the new content being recorded is high priority, that is exceeds a particular priority number. If so, the process would go to step 705. If however, the new content being recorded is determined to be of low priority and does not exceed particular priority number, the content could be stored directly on the external drive 410. If there is sufficient space found on the internal drive's RAID partition in step 705, then in step 725 the content recording is stored on the internal drive's RAID partition and the process continues to step 730. On the other hand, if it is determined in step 705 that insufficient space is available on the internal drive's RAID partition, then in step 710 it is determined whether there is any space available on the internal drive's other partition (e.g., "Partition C" of internal drive 405 shown in FIG. 4D). If it is found that there is no space available on the internal drive's other partition in step 710, then in step 715 the lowest priority content recording stored on the internal drive's other partition may be deleted to make space available. If space is found to be available on the internal drive's other partition in step 710, then the process goes to step 720 where enough of the highest priority content recordings (e.g., two or three content recordings) stored on the internal drive's RAID partition are moved to the internal drive's other partition so that space is made available on the internal drive's RAID partition to store the new content recording in step 725.

Following step 725 the process moves to step 730, where a series of steps similar to steps 705 through 725 is carried out with respect to the external drive. More specifically, in step 730 it is determined whether there is space available on the RAID partition of the external drive (e.g., "Partition B" of external drive 410 shown in FIG. 4D) to mirror all of the content recordings stored on the RAID partition of the internal drive. If there is enough available space found in step 730, then the process goes to step 750 where the content recordings stored on the RAID partition of the internal drive are mirrored onto the RAID partition of the external drive and the process ends. However, if it is instead determined in step 730 that insufficient space exists on the RAID partition of the external drive, then in step 735 it is determined whether there is any space available on the external drive's other partition (e.g., "Partition A" of external drive 410 shown in FIG. 4D). If it is found that there is no space available on the external drive's other partition in step 735, then in step 740 the lowest priority content recordings stored on the external drive's other partition may be deleted to make space available. If space is found to be available on the external drive's other partition in step 735, then the process goes to step 745 where enough of the highest priority content recordings stored on the external drive's RAID partition are moved to the external drive's other partition so that space is made available on the external drive's RAID partition to mirror the content recordings from the internal drive's RAID partition. Similar to the flowchart shown in FIG. 5 and described above, in some arrangements the system may determine which of the highest priority content recordings stored in the RAID partition of the external drive are not also stored on the RAID partition of the internal drive in order to selectively move such content recordings into the other partition of the external drive. As such, any high-priority content recordings stored only on the external drive are not lost on the external drive when, in step 750, the content recordings stored on the RAID partition of the internal drive are mirrored to the RAID partition of the external drive.

It is to be appreciated that other RAID options and configurations may also be used with various combinations of drives in addition to or instead of those illustrated in FIGS. 4A-4D. For example, RAID 5 options may be used in arrangements where three drives are used in conjunction with a gateway device, such as two external Serial Advanced Technology Attachment (eSATA) drives compliant with the Serial ATA Revision 3.0 Specification developed and published by the Serial ATA International Organization, and one internal drive. In still other examples, RAID 5 may be used in arrangements of any type of drive such a between USB/eSATA.

Additionally, in one or more of the drive arrangements illustrated in FIGS. 4A-4D, as well as in other drive arrangements and combinations that may similarly be used to implement the various features of the present disclosure described herein, the drives may be intelligently recombined and/or repartitioned in response to determining that one or more of the drives is failing. For example, internal and external drives used in conjunction with one or more gateway devices as described above may have Self-Monitoring, Analysis, and Reporting Technology (S.M.A.R.T.) built into them such that the health and reliability of the drives may be monitored and various failure indicators used to predict failures in the drives before they actually occur. Such S.M.A.R.T.-capable drives may be used with gateway devices configured with, for example, S.M.A.R.T. reporting and monitoring software capable of reading S.M.A.R.T. data from the drives and assessing the reliability of the drives accordingly.

Figure 8:
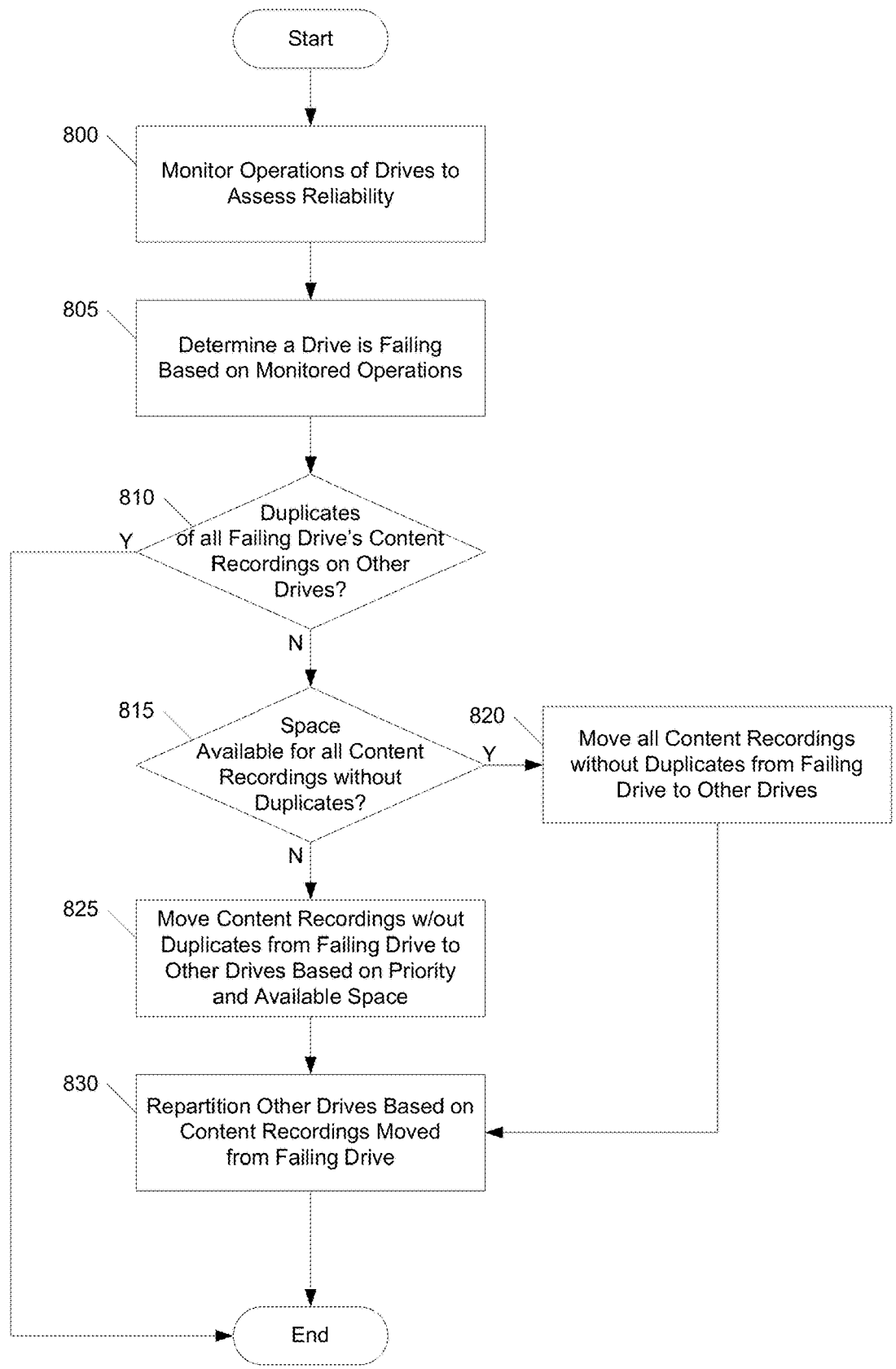
FIG. 8 is a flowchart illustrating yet another example method of intelligently repartitioning and relocating stored content recordings across multiple memory devices in response to a detected failure in a memory device according to one or more aspects described herein.

FIG. 8 is a flowchart illustrating an example method of intelligently relocating stored content recordings across multiple drives in response to determining that one or more of the drives are failing, as described above. The process begins at step 800 where the gateway device being used with the drives monitors operations of the drives to assess or evaluate the reliability of each drive. As described above, the operations of the drives may be monitored by using, for example, S.M.A.R.T.-capable drives in conjunction with a gateway device capable of reading S.M.A.R.T. data fed to it from the drives during their operation. In step 805, the gateway device may determine based on, for example, S.M.A.R.T. data obtained from the drives that indicates a drive is failing or is likely to fail sometime in the near future. Accordingly, in step 810 it is determined whether duplicate copies of all of the failing drive's content recordings are already stored on other drives. If so, then there is no concern about any content recordings stored on the failing drive being permanently lost and the process ends. The reason for there not being any concern is that even if the drive suspected of failing does fail, then the content recordings that were stored on the drive can be mirrored or duplicated from the other drives. In at least one arrangement, the step of determining whether duplicate copies of all of a failing drive's content recordings are already stored on other drives (e.g., step 810) may be repeated at periodic intervals of time up until the drive actually fails or is replaced so as to ensure that all content recordings stored on the failing drive are accounted for.

If in step 810 it is instead found that duplicate copies of all of the failing drive's content recordings are not already stored on other drives, then the process continues to step 815, where it is determined whether there is enough space available on the other drives for storing the content recordings of the failing drive that do not have duplicate copies already stored elsewhere. In one arrangement step 815 may include determining whether there is space available on any single drive being used in conjunction with the failing drive while in another arrangement step 815 may include assessing combined space availability from multiple drives being used. If it is determined in step 815 that there is enough space available on one or more of the other drives to store the non-duplicated content recordings from the failing drive, then at step 820 all such non-duplicated content recordings may be moved off of the failing drive and onto the one or more other drives. However, if it is found at step 815 that there is not enough space available on the other drives, then the process goes to step 825 where the content recordings without duplicates are moved from the failing drive to the other drives based on priority and available space. For example, non-duplicated content recordings may be moved off of the failing drive to the other drives in order of highest to lowest priority until there is no more available space on the other drives. This ensures that the highest priority non-duplicated content recordings from the failing drive are not lost once a failure actually occurs.

In one or more arrangements, step 825 may include assessing the priorities of the content recordings stored on the other non-failing drives against the priorities of the non-duplicated content recordings desiring to be moved off of the failing drive to determine whether one or more content recordings stored on the non-failing drives should be deleted to make additional space available. For example, if a non-duplicated content recording on the failing drive has a priority level of "2" while a content recording on another non-failing drive has a priority level of "4" assigned to it, then the content recording with a priority level of "4" may be removed from the non-failing drive so that space becomes available for moving the non-duplicated content recording with a priority level of "2" from the failing drive. In similar arrangements, rather than simply removing the content recording with a priority level of "4" from the non-failing drive, the content recording may instead take the place of the non-duplicated content recording with a priority level of "2" on the failing drive. In this arrangement there may be enough time for the failing drive to be replaced such that the content recording moved onto the failing drive may also be saved; however, the risk of losing the higher priority content in the event that the failing drive is not replaced in time is avoided.

Following either of steps 820 and 825 in FIG. 8, the process continues to step 830 where, once the non-duplicated content recordings have been moved from the failing drive to the other drives, the other drives are repartitioned and/or recombined as needed to account for the relocated content recordings. For example, one or more of the other drives may need its storage space repartitioned so as to continue storing, and therefore mirroring, the content recordings in accordance with the configuration or settings established by the user or based on intelligent recognition of the user's preferences. Additionally, in some arrangements step 830 may include reprioritizing the content recordings before performing any repartitioning and recombining actions.

According to one or more aspects described herein, an external drive (e.g., external drive 410 shown in FIGS. 4A-4D) containing stored content recordings may be portable and usable between multiple different gateway devices (e.g., gateway 111 shown in FIG. 1) such that the stored recordings may be accessed (e.g., viewed or displayed) at different locations and/or user premises. For example, a user may be provided with the ability to remove an external drive from one gateway device (e.g., set-top box) located in the user's home (e.g., home 102a shown in FIG. 1) and attach the drive to a second gateway device also located in the user's home or instead located at one or more other homes 102 of other users. As described above, content recordings may be stored across one or more external drives based on priority levels of the recordings. Accordingly, the portability of external drives allows users to access high priority content recordings at more than one location and/or through different types of compatible gateway devices.

In one or more arrangements content can be downloaded or synchronized to a user's portable drive at a different location or premises (e.g., at a friend's home). For example, content on the gateway device (e.g., DVR) at the different location can be recorded onto the user's portable drive. When the user returns to his/her premises and plugs the portable drive into his/her home gateway device, a reverse process can occur. For example, instead of moving lower priority content to the less redundant/slower partitions, the gateway device would be able to detect the new/high priority content downloaded by the user from another location and synchronize that content to the appropriate priority partition. For example, the home gateway device may move or mirror the content onto the internal drive. The content would likely be put on the internal drive after ensuring space is available on the internal drive using techniques such as described above.

In other arrangements, each external drive that may be configured for use as a portable storage device to allow users to access stored content recordings on multiple gateway devices has a unique identifier associated with the drive. In one example, the identifier may be used to identify the external drive's "home" gateway device or "command" gateway device such that the external drive can only have its settings changed or altered, or otherwise reconfigured when the drive is connected to its "home" or "command" gateway. For example, a user may configure an external drive connected to a gateway device at the user's premises such that only content recordings assigned a priority level that meets a certain threshold (e.g., priority level of 3 or lower) are stored or mirrored on the external drive by the gateway device. If the external drive is subsequently connected to a different gateway device located elsewhere at the user's premises or located at another user's premises, then the unique identifier associated with the drive may prevent the external drive from being reconfigured with settings different from those described above (e.g., only storing content recordings with a priority level of 3 or lower). In at least one arrangement, the external drive may be prevented from being reconfigured as a result of the identifier not matching a corresponding identifier of the different gateway device or the identifier not being recognized by the different gateway device. It is to be appreciated that the unique identifier associated with the external drive may also be used in numerous other ways to protect configuration settings and/or stored content recordings from being changed, copied, erased, etc., in addition to or instead of the example uses described above.

In still other arrangements a user may wish to have more than one "home" gateway device and/or multiple external drives or storage devices for storing content recordings. For example, a user may want to create a backup copy of all the highest priority content currently stored on a primary external drive connected to a first gateway device located in the user's home. In a situation where only one external drive or storage device may be connected or otherwise attached to the first gateway device because, for example, the first gateway device only recognizes the unique identifier associated with the primary external drive, it may be necessary for the user to disconnect the primary external drive from the first gateway device, connect the primary external drive to a second gateway device, copy the stored content recordings from the primary external drive to the second gateway device, remove the primary external drive and connect a secondary external drive so that the content recordings can be copied from the second gateway device to the secondary external drive.

In a different arrangement, more than one external drive may be configured so as to be recognized by the same "home" gateway device such that, continuing with the above example, if the primary external drive is completely synchronized (e.g., mirrored) with the internal drive of the first gateway device then the secondary external drive may be connected to the first gateway device once the primary external drive is removed. All of the content recordings stored on the internal drive of the first gateway device may then be mirrored to the second external driver, thereby providing a backup of the primary external drive without requiring a second gateway device. In further arrangements, the primary external drive may contain content recordings not also stored on the internal drive of the gateway device, but for which the user wishes to make backup copies. Accordingly, the user may transfer copies of only those content recordings desired for backup from the primary external drive to the internal drive of the gateway device, connect the secondary external drive to the gateway device so that the secondary external drive may be synchronized with the internal drive, and then reconnect the primary external drive in place of the secondary external drive so that the gateway device may be resynchronized with the content recordings stored on the primary drive. It should be understood that numerous other arrangements and/or combinations of compatible external drives or storage devices and multiple "home" gateway devices may also be utilized to implement the various aspects described herein in addition to or instead of those described above.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method comprising:
   receiving, at a computing device, a plurality of content items comprising a first content item and a second content item;
   determining a priority level of the first content item and a priority level of the second content item;
   based on a determination that the priority level of the first content item is associated with a high priority level, storing the first content item in a mirrored storage partition of an internal storage of the computing device, wherein the mirrored storage partition of the internal storage corresponds to a mirrored partition of an external storage device, and wherein the external storage device is external to the computing device;
   based on a determination that the priority level of the second content item is not associated with the high priority level, transmitting the second content item to be stored in a non-mirrored storage partition of the external storage device; and
   transmitting, by the computing device and during a time period when the computing device is in a standby mode, the first content item that has been stored in the mirrored storage partition of the internal storage of the computing device to the mirrored partition of the external storage device.

2. The method of claim 1, further comprising:
   based on determining the priority level of the first content item, determining whether an associated storage partition of the internal storage of the computing device associated with the determined priority level of the first content item has sufficient storage space available to store the first content item; and
   based on a determination that the associated storage partition has sufficient storage space available to store the first content item, storing the first content item in the associated storage partition of the internal storage.

3. The method of claim 1, further comprising:
   transmitting content items stored in a first storage partition of the mirrored storage partition of the internal storage to a first mirrored partition of the external storage device; and
   transmitting content items stored in a second storage partition of the mirrored storage partition of the internal storage to a second mirrored partition of the external storage device.

4. The method of claim 1, further comprising:
   determining whether the mirrored storage partition of the internal storage has sufficient storage space available to store the first content item; and
   based on a determination that the mirrored storage partition of the internal storage has sufficient storage space available to store the first content item, storing the first content item in the mirrored storage partition.

5. The method of claim 1, further comprising:
   determining whether the mirrored storage partition of the internal storage has sufficient storage space available to store the first content item; and
   based on a determination that that the mirrored storage partition of the internal storage has insufficient storage space available to store the first content item, deleting one or more lower priority content items stored in the mirrored storage partition until the mirrored storage partition has sufficient storage space available to store the first content item,
   wherein the lower priority content items are associated with one of an about to be deleted priority level, a duplicate content item priority level, or a live buffer priority level.

6. The method of claim 2, further comprising:
   based on a determination that the associated storage partition has insufficient storage space available to store at least one of the plurality of content items, deleting one or more lower priority content items stored in the associated storage partition until the associated storage partition has sufficient storage space available to store the at least one of the plurality of content items.

7. The method of claim 1, further comprising:
   determining whether the mirrored partition of the external storage device has sufficient storage space available to store the first content item; and
   based on a determination that the mirrored partition of the external storage device has insufficient storage space available to store the first content item, deleting one or more lower priority content items stored in the mirrored partition of the external storage device until the mirrored partition has sufficient storage space available to store the first content item.

8. The method of claim 1, wherein the high priority level is associated with one of: a do not delete priority level, a not accessed newer content item priority level, or an accessed priority level.

9. A method comprising:
   receiving, at a computing device, a first content item and a second content item;
   prior to storing the first content item in at least one of an internal storage of the computing device or an external storage device in communication with the computing device, determining a priority level of the first content item;
   based on a determination that the priority level of the first content item is associated with a first priority level, storing the first content item in a storage partition of the internal storage of the computing device which corresponds to a mirrored partition of the external storage device, wherein the external storage device is external to the computing device and wherein the first priority level is a high priority level;

based on a determination that a priority level of the second content item is not associated with the first priority level, transmitting the second content item to be stored in a non-mirrored storage partition of the external storage device and not storing the second content item in the internal storage of the computing device; and transmitting, by the computing device and during a time period when the computing device is in a standby mode, the first content item that has been stored in the internal storage of the computing device to the mirrored partition of the external storage device.

10. The method of claim 9, further comprising:
determining a priority level of a third content item; and
storing the third content item in the storage partition of the internal storage of the computing device, which corresponds to the mirrored partition of the external storage device,
wherein storing the first content item and the third content item in the storage partition of the internal storage of the computing device which corresponds to the mirrored partition of the external storage device comprises:
determining whether the priority levels of the first and third content items satisfy a second priority level associated with a first storage partition of the internal storage of the computing device;
based on a determination that the priority level of the first content item satisfies the second priority level, storing the first content item in the first storage partition of the internal storage;
based on a determination that the priority level of the third content item does not satisfy the second priority level, determining whether a second storage partition of the internal storage of the computing device has sufficient storage space available to store the third content item; and
based on a determination that the second storage partition has insufficient storage space available to store the third content item, deleting one or more lower priority content items stored in the second storage partition until the second storage partition of the internal storage has sufficient storage space available to store the third content item.

11. The method of claim 10, further comprising:
after the deleting, storing the third content item in the second storage partition of the internal storage; and
transmitting content items stored in the second storage partition of the internal storage to a mirrored partition of the external storage device.

12. The method of claim 10, wherein the second priority level is a highest priority level of a plurality of priority levels.

13. The method of claim 10, further comprising:
determining whether the mirrored partition of the external storage device has sufficient storage space available to store the first content item; and
based on a determination that the mirrored partition of the external storage device has insufficient storage space available to store the first content item, deleting one or more lower priority content items stored in the mirrored partition of the external storage device until the mirrored partition has sufficient storage space available to store the first content item.

14. The method of claim 10, wherein the third content item is different from each content item already stored in either of the first storage partition or the second storage partition.

15. A method comprising:
receiving, at a computing device, a plurality of content items;
determining priority levels of the plurality of content items;
based on a determination that the priority levels of both a first content item and a second content item are associated with a first priority level, storing the first content item and the second content item in storage partitions of an internal storage of the computing device which correspond to mirrored partitions of an external storage device, wherein the first priority level is a high priority level, the storing comprising:
determining whether the priority levels of each of the first content item and the second content item are equivalent to a second priority level associated with a first storage partition of the internal storage of the computing device;
based on determination that the priority level of the first content item is equivalent to the second priority level, determining whether the first storage partition of the internal storage has sufficient storage space available to store the first content item;
based on a determination that the first storage partition of the internal storage has sufficient space available to store the first content item, storing the first content item in the first storage partition of the internal storage; and
based on a determination that the priority level of the second content item is not equivalent to the second priority level, storing the second content item in a second storage partition of the internal storage of the computing device;
based on a determination that the priority level of a third content item is not associated with the first priority level, transmitting the third content item to be stored in a non-mirrored partition of the external storage device and not storing the third content item in the internal storage of the computing device; and
during a time period when the computing device is in a standby mode, transmitting content items that have been stored in mirrored partitions of the internal storage of the computing device to the mirrored partitions of the external storage device, wherein the external storage device is external to the computing device.

16. The method of claim 15, further comprising:
based on a determination that the priority level of a fourth content item is associated with the first priority level, storing the fourth content item in the storage partitions, of the internal storage of the computing device which correspond to mirrored partitions of the external storage device, the storing of the fourth content item comprising:
based on a determination that the first storage partition of the internal storage has insufficient space available to store the fourth content item, deleting one or more lower priority content items stored in the first storage partition until the first storage partition has sufficient storage space available to store the fourth content item; and
storing the fourth content item in the first storage partition.

17. The method of claim 15, further comprising:
prior to determining whether a particular priority level is equivalent to the second priority level, determining that the particular priority level satisfies a predetermined priority threshold.

18. The method of claim 15, further comprising:
transmitting content items stored in the first storage partition of the internal storage to a first mirrored storage partition of the external storage device; and
transmitting content items stored in the second storage partition of the internal storage to a second mirrored partition of the external storage device.

19. The method of claim 15, further comprising:
prior to the storing the second content item in the second storage partition of the internal storage, determining whether the second storage partition has sufficient storage space available to store the second content item; and
based on a determination that the second storage partition has insufficient space available to store the second content item, deleting one or more lower priority content items stored in the second storage partition until the second storage partition has sufficient space available to store the second content item.

20. The method of claim 15, further comprising updating a priority level of at least one content item of the plurality of content items.

\* \* \* \* \*

UNITED STATES PATENT AND TRADEMARK OFFICE
CERTIFICATE OF CORRECTION

PATENT NO. : 10,565,139 B2
APPLICATION NO. : 14/494033
DATED : February 18, 2020
INVENTOR(S) : Ross Gilson Page 1 of 1

It is certified that error appears in the above-identified patent and that said Letters Patent is hereby corrected as shown below:

In the Claims

Column 22, Claim 5, Line 17:
Please delete "that that" and insert --that--

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*